March 17, 1970  H. BOSLER  3,500,968
DISC BRAKE AND MOUNTING THEREFOR
Filed July 25, 1968  2 Sheets-Sheet 1

INVENTOR.
Helmut Bosler
BY

March 17, 1970  H. BOSLER  3,500,968
DISC BRAKE AND MOUNTING THEREFOR
Filed July 25, 1968  2 Sheets-Sheet 2

INVENTOR.
Helmut Bosler
BY

United States Patent Office 3,500,968
Patented Mar. 17, 1970

3,500,968
DISC BRAKE AND MOUNTING THEREFOR
Helmut Bosler, Wiehl, Germany, assignor to Bergische Achsenfabrik Fr. Kotz & Sohne, Wiehl, Bezirk-Cologne, Germany
Filed July 25, 1968, Ser. No. 747,550
Claims priority, application Germany, July 25, 1967,
1,630,140
Int. Cl. F16d 55/02
U.S. Cl. 188—73    5 Claims

ABSTRACT OF THE DISCLOSURE

First and second brake-lining means are arranged on opposite sides of brake disc means connected to a wheel hub of a vehicle having an axle body on which a carrier is secured. Two bearing pins each have guide portions on opposite sides of the carrier. Pin guide portions permit sliding thereon both by first brake-lining and a caliper-type saddle carrying the second brake-lining means. A cam on a shaft is journalled by the carrier in a location between thrust and opposing members. Cam force is transmitted through the thrust member directly to one brake-lining means and through the opposing member secured to the caliper-type saddle with the other brake-lining means.

---

The present invention relates to a disc brake for motor vehicles, especially trucks and vans, with brake-linings in the form of ring sections secured to brake lining carriers on both sides of a brake disc.

It is an object of this invention to provide a brake disc, especially for motor vehicles, which is simple in construction and reliable in operation.

It is another object of this invention to provide a brake disc, as set forth in the preceding paragraph, which will withstand high loads and will permit an easy replacement of the brake-lining.

According to the present invention there is provided a disc brake for a motor vehicle comprising brake-lining carriers arranged to slide axially, one carrier being actuable by movement of saddle or caliper means and the other carrier directly on two pins, to enable brake pads carried by the carriers to be thrust against a brake disc by a cam fast with a camshaft which extends parallel to the axis of the brake disc, said cam having two symmetrical cam faces acting directly on a thrust member mounted non-rigidly on one of the brake-lining carriers and on an opposing member rigid with the saddle or caliper means.

An embodiment of a disc brake according to the invention is illustrated by way of example in the accompanying drawings, in which.

Figure 1:
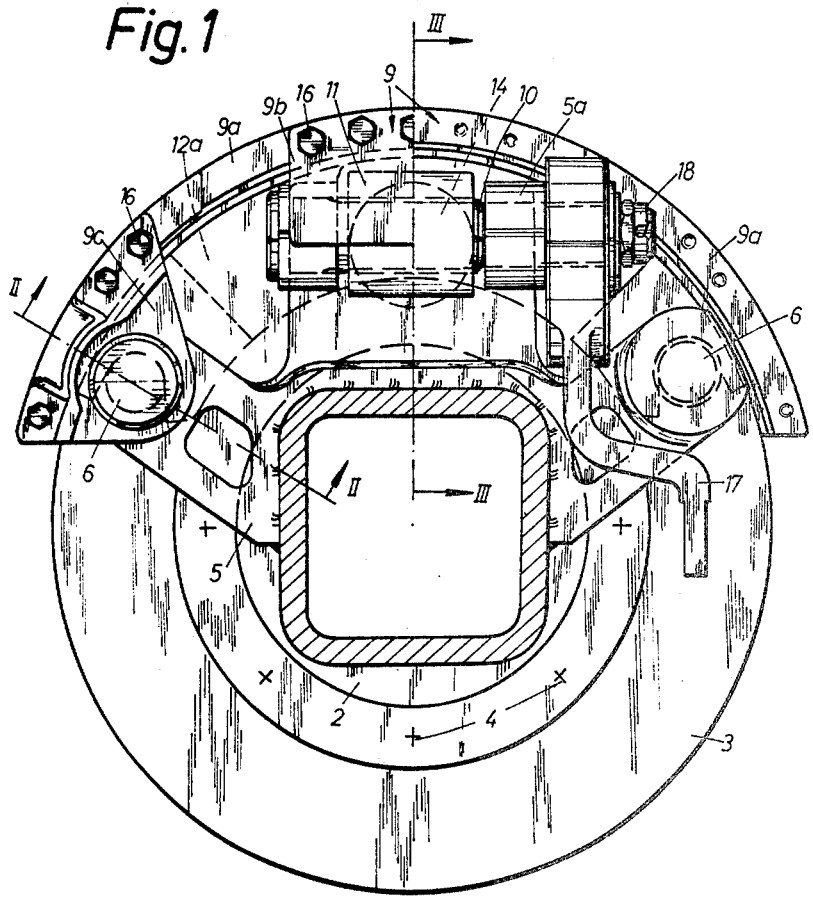
FIGURE 1 shows a section through an axle having mounted thereon a disc brake, the left-hand half of the FIG. 1 illustrating a complete side elevation of the brake and the right-hand half showing a side elevation with certain parts omitted so as to show the constructional details more clearly.

A disc brake according to the invention includes an annular brake disc 3, which is secured by connecting bolts 4 to the wheel-hub 2 of the axle 1. This wheel-hub 2 is mounted on the axle 1 by conventional means, details of which have accordingly been omitted from the drawing.

Welded to the axle 1 is a carrier 5, on which two bearing pins 6 are mounted and which carries two lugs 5a providing bearings for a camshaft 10.

Figure 2:
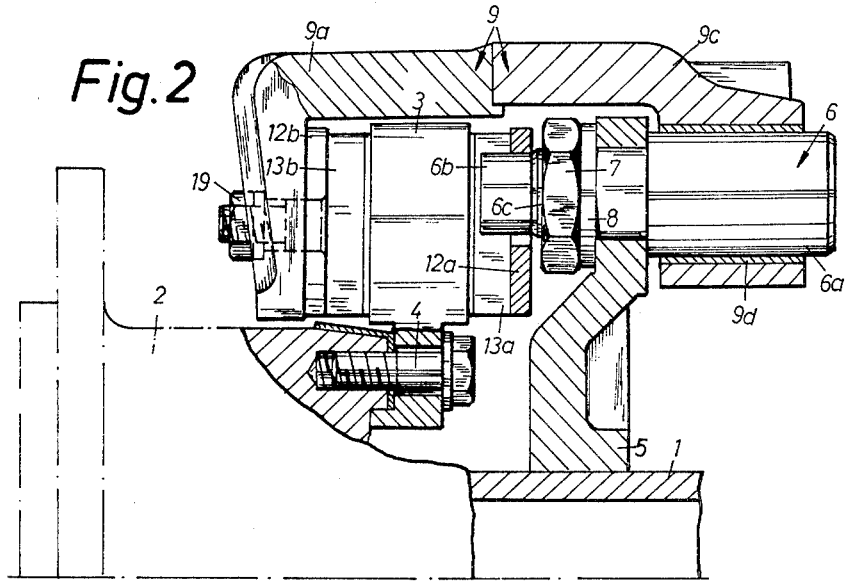
FIGURE 2 is a section along the line II—II in FIG. 1.

This camshaft 10 extends parallel to the face of the brake disc 3 and bears a cam 11, with two symmetrical cam faces. The cam 11 co-operates, through the agency of these cam faces, with a thrust member 14 on the one side and against an opposing member 15 on the other side. The thrust member 14 is connected directly to a brake-lining carrier 12a, on which a brake-lining pad 13a is fitted, so that this pad 13a receives direct thrust from the cam 11, whereas the opposing member 15 is rigid with a saddle or caliper member 9b, which extends beyond and over the periphery of the brake disc 3 to the opposite side of the latter (that is to say opposite to the side on which the cam 11 is situated), where it is connected, e.g. by bolts 19 (FIG. 2), to the brake-lining carrier 12b, which is fitted with the other brake-lining pad 13b.

Figure 3:
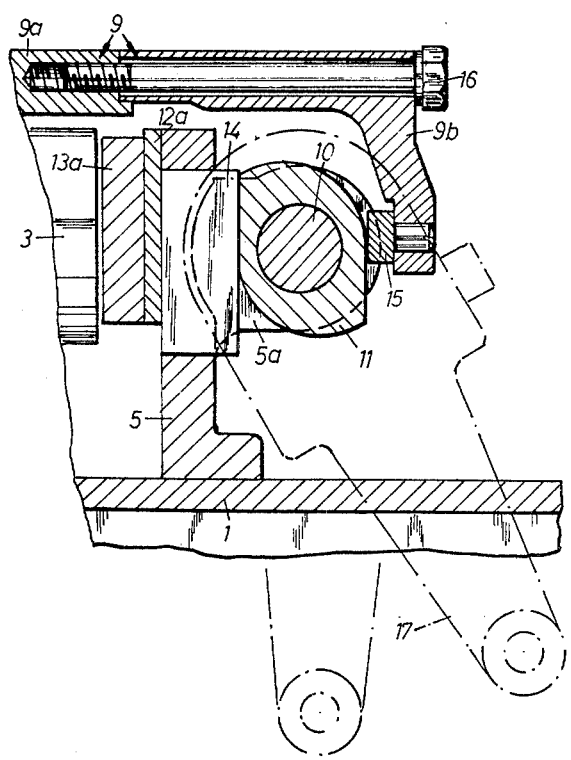
FIGURE 3 is a section of the disc brake along the line III—III in FIG. 1.

To provide a mounting for the brake-lining carrier 12b on that side of the brake disc 3 which lies opposite to the camshaft 10, the saddle or caliper 9 is mounted with freedom to slide axially on a guide portion 6a, of the bearing pins 6. Thus, when the camshaft 10 is operated, the saddle 9 is moved to the right (as viewed in FIGURES 2 and 3), so that the brake lining pad 13b is forced against the brake disc 3 at the same time as the brake-lining 13a. While the saddle 9 is guided as already described on the guide portion 6a of the bearing pins 6, guidance for the brake-lining carrier 12a is derived from another guide portion 6b, of each bearing pin 6, which extend into recesses at the ends of the brake-lining carrier 12a, as shown in FIG. 1.

In the example illustrated, the diameter of the guide portion 6a of the bearing pins 6 is larger than the diameter of the guide portion 6b. Between these two portions 6a and 6b there is a mounting portion 6c, of intermediate diameter, which is screw-threaded at the end nearer to the guide portion 6b. For securing the bearing pin 6 in position, it is inserted into the carrier 5 in the position shown in FIG. 2 and tightened by a nut 7, screwed on to the screw-thread of the mounting portion 6c and acting in co-operation with a spring washer 8. This leaves the two guide portions 6a and 6b projecting from the two side faces of the carrier 5.

In the example shown, the saddle or caliper 9 mounted on the guide portion 6a is made up of several parts. It includes one member 9a, to which the brake-lining carrier 12b with its lining 13b is secured by the bolts 19. To each end of this saddle member 9a, a bearing member 9c, which incorporates a bush 9d, for mounting on the guide portion 6a of the bearing pin 6 concerned, is held in place by bolts 16. In the central part, likewise held in place on the saddle member 9a by the bolts 16, is a tongue-shaped saddle member 9b, which carries the opposing member 15 for transmitting motion to the saddle 9 as a whole.

The cam 11 is operated by way of a link-rod control 17, (chain lines) which is secured to the camshaft 10 by a crown nut 18 and can be adjusted manually or automatically.

The invention provides a disc brake for motor vehicles which, because of the arrangement and design of the various components, as described above, is of particularly simple construction and easy to assemble or to dismantle for renewal of the brake-linings, for example.

It is, of course, to be understood that the present invention is, by no means, limited to the particular design shown in the drawings, but permits of various modifications, the scope of the invention being determined by the invention.

It is also to be understood that means, e.g. yieldable spring means (not shown), will automatically cause the brake-lining 13a, 13b to disengage the brake disc 3 when control lever 17 is disengaged by the operator.

What I claim is:

1. A disc brake structure for an axle body of a motor vehicle having a wheel with a hub and comprising: brake disc means adapted to be connected to the wheel hub, carrier means adapted to be connected to the axle body, guiding means including two bearing pins mounted on said carrier means and each having guide portions on axially spaced opposite sides of said carrier means, a caliper-type saddle mounted with freedom to slide axially on guide portions on one side of each of said bearing pins, first brake-lining means arranged on one side of said brake disc means and guided on guide portions of an opposite side of each of said bearing pins, second brake-lining means arranged on the opposite side of said brake disc means and secured to said caliper-type saddle, lug means projecting laterally from said carrier means, a shaft having bearing support provided by said lug means and having its axis extending substantially parallel to said brake disc means, cam means secured to said shaft and having two diametrically oppositely located cam surfaces symmetrically arranged with regard to axis of rotation of said cam means, a pressure thrust member supported by said carrier means and connected to transmit cam means force directly to said first brake-lining means, and an opposing member carried by said caliper-type saddle and engaged by said cam means concurrently with force transmittal to said first brake-lining means, said first and second brake-lining means being operatively urged upon movement of said cam means selectively to frictionally engage said brake disc means in response to rotation of said cam means in one direction which transmits force simultaneously through said pressure thrust member directly to said first brake-lining means and through said opposing member carried by said caliper-type saddle to said second brake-lining means.

2. A disc brake structure according to claim 1, wherein said pins are fixed to said carrier means rigidly connected with respect to the axle body and said pins have opposite ends projecting from both sides of said carrier means to form said guide portions for said caliper-type saddle and for carrying one of said brake-lining means respectively.

3. A disc brake structure according to claim 2, wherein said guide portion of each pin for said caliper-type saddle is larger in diameter at said guide portion for carrying one brake-lining means, said pin having a screw-threaded portion of intermediate diameter between these two guide portions to enable said pin to be mounted in said carrier means, and a lock nut fitted to said screw-threaded portion for holding said pin to said carrier means.

4. A disc brake structure according to claim 3 wherein said saddle includes one member carrying one of said brake-lining means, one tongue-shaped member bearing said opposing member, and two bearing members each incorporating a bushing for mounting on a respective one of said pins.

5. A disc brake structure according to claim 3, wherein said carrier means has two lug means to form bearings for said shaft to journal said cam means.

References Cited

UNITED STATES PATENTS

| | | | |
|---|---|---|---|
| 2,781,106 | 2/1957 | Lucien | 188—73 X |
| 2,966,964 | 1/1961 | Brueder | 188—73 |
| 3,013,636 | 12/1961 | Dotto et al. | 188—73 X |
| 3,194,351 | 7/1965 | Swift | 188—73 |
| 3,256,959 | 6/1966 | Eggstein | 188—73 |

GEORGE E. A. HALVOSA, Primary Examiner